O. W. SCHAUM.
BALL GAGE.
APPLICATION FILED OCT. 26, 1912.

1,118,587. Patented Nov. 24, 1914.

Witnesses,
Roswell F. Hatch.
Beatrice T. Smith.

Inventor,
Otto W. Schaum
by Robt. F. Harris
Atty.

UNITED STATES PATENT OFFICE.

OTTO W. SCHAUM, OF PHILADELPHIA, PENNSYLVANIA.

BALL-GAGE.

1,118,587.  Specification of Letters Patent.  Patented Nov. 24, 1914.

Application filed October 26, 1912. Serial No. 727,931.

*To all whom it may concern:*

Be it known that I, OTTO W. SCHAUM, a citizen of the United States, residing at Philadelphia, county of Philadelphia, and State of Pennsylvania, have invented an Improvement in Ball-Gages, of which the following description, in connection with the accompanying drawings, is a specification, like letters on the drawings representing like parts.

The invention to be hereinafter described relates to ball gages, and more particularly to such gages as are employed in gaging the cylindrical or circular opening in objects. To enable such gage to be properly manipulated, the ball, which constitutes the gaging element, must be mounted on a handle, and at the same time it must be true and of hardened or tempered material, such as steel. With these matters in mind, the aims and purposes of the present invention are to provide a gage of this character, whereby a suitable handle may be permanently and securely attached to the ball gage while still maintaining the hardened or tempered character and its true spherical form unimpaired, all of which will best be made clear from the following description and accompanying drawings of a ball gage embodying the invention.

Figure 1:
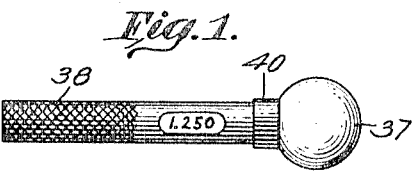
Figure 2:
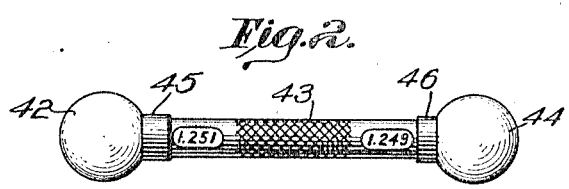
Figure 3:
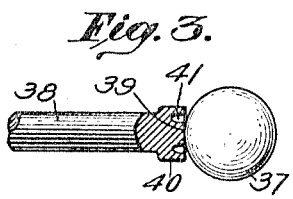
Figure 4:
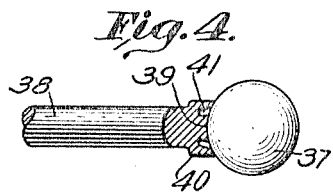

In the drawings:—Figure 1 is an elevation of a ball test gage and attached handle embodying features of the present invention; Fig. 2 is a similar view, showing the handle having a ball gage attached in accordance with the present invention, at each end; Fig. 3 shows the form of handle and its relation to the ball as the parts are brought together preliminary to the welding operation, the lower wall of the handle being broken away to show the interior welding spur and the surrounding ferrule; and Fig. 4 is a view similar to that of Fig. 3 showing the relation of the parts after the welding operation, the welding spur being indicated as spread out and integrated with the ball, and the ferrule contacting with the ball about the weld and inclosing the same.

Ball test gages or ball gages are employed to measure or test bores of cylinders or holes in rings and the like, and to this end must not only be truly spherical, but also of hardened or tempered material. To properly manipulate such gage, it should be attached to a handle. To bore the ball, insert a soft plug, and screw-thread or otherwise connect the handle to the soft plug, are unsatisfactory, because injury to the ball is liable to result, the handle is liable to become loose and in some cases become detached from the ball when the latter has been inserted in a hole to be gaged. The consequence is that the ball cannot be extracted without injury either to it or the object in which it is caught. A more secure and integral connection between the handle and ball is desired, and this the present invention contemplates by securing the ball to the handle by an electrical weld thus integrating the ball and handle without at the same time causing injury to the hardened or tempered character of the ball.

The ball which constitutes one of the gage elements is formed true and of the appropriate size required for the particular gage. It is then hardened by heating and quenching, as usual, and may be then welded to the handle, or it may be further treated by subjecting the hardened ball to the tempering operation. The handle 38 is also formed of metal and at the end to be welded to the ball, it has formed a welding spur 39, Fig. 3, and surrounding the same is a ferrule 40 integral with the handle. It is appropriate to note at this point that the integral ferrule 40 which surrounds the welding spur 39, forms between itself and said spur, a recess 41 of sufficient size to permit the flow of the metal spur outward, as indicated in Fig. 4, when the parts are welded together, as may be done by appropriate electrical welding means, which, however, form no part of the present invention and therefore need not be described. The handle and ball being brought into welding relation, as indicated in Fig. 3, the current passes, as usual, between the said parts, and the welding spur 39 becomes integrated with the metal of the ball, the metal of the spur flowing outward somewhat as the handle and ball are pressed together, until the edges of the ferrule come in contact with the ball, as indicated in Fig. 4, at which time the handle and ball will have become thoroughly united. During the welding operation the circulation of cold water may be maintained about the ball and handle, so that in neither of these is the hardened condition of the ball or temper originally placed therein, as the case may be, destroyed, and when the handle and ball have been integrally joined, the parts assuming the appearance indicated in Fig. 1. The ball gage thus comprises a ball of the desired size, and a handle electrically welded thereto without causing injury to the character of the parts united, and the ferrule, integral with the handle, surrounds the weld joint.

It is sometimes desirable to provide the handle with a ball at each end, as indicated in Fig. 2, said balls differing in size, such that one of the balls will be slightly under and the other slightly over the gage desired for the hole to be tested. In such case, the gage presents important features of structure and enables the operative to determine by one and the same implement any unwarranted or unacceptable variation in the size of the hole tested, one ball freely entering said hole and the other not entering. In this case the balls at opposite ends of the handle are connected thereto in the manner hereinafter described, and as suggested by Fig. 2, one ball may be two thousandths of an inch smaller than the other, such variations being denoted on the handle adjacent each ball. To obviate the necessity of consulting such figures or numbers to ascertain which is the larger and which the smaller ball, the present invention contemplates a variation in the external dimensions, character, size, or form of the ferrules, such that by the sense of touch the operative may at once know which ball is the large or small one. In Fig. 2, for instance, the ball 42 at the left of the handle 43 gaged to 1.251 of an inch is larger than the ball 44 at the opposite end of the handle, which is gaged to 1.249 of an inch, and the integral ferrule 45 covering the weld of handle 43 and ball 42 is larger than the ferrule 46 covering the weld of the handle and ball 44, so that by feeling the ferrules, an operative becomes at once informed which ball is being used.

What is claimed is:—

1. A ball gage comprising a ball having an uninterrupted spherical surface, a handle having an enlarged end provided with an annular groove forming a welding spur and a ferrule to bear upon the spherical surface of the ball surrounding the welding spur, said spur being electrically welded to the ball within the surrounding ferrule.

2. A ball gage comprising a handle having an integral ferrule at each end of different external dimensions, each end being provided with an annular groove forming a welding spur and gage balls of different sizes, one at each end of the handle, the spur at each end of said handle being electrically welded to the ball adjacent thereto.

3. A ball gage, comprising a handle having an integral ferrule at each end of different external dimensions, and gage balls of different sizes electrically welded to said handle, one at each end thereof.

In testimony whereof, I have signed my name to this specification, in the presence of two subscribing witnesses.

OTTO W. SCHAUM.

Witnesses:
E. C. RHOADS,
JOHN THIEL.